United States Patent [19]

Alger et al.

[11] 4,006,861
[45] Feb. 8, 1977

[54] MACHINE TOOL COOLANT APPARATUS

[75] Inventors: Shirl R. Alger, Rowland Heights; Ronald S. Arnold, Brea; Manfred Schuler, Newport Beach, all of Calif.

[73] Assignee: All-Power Manufacturing Co., Montebello, Calif.

[22] Filed: Feb. 12, 1976

[21] Appl. No.: 657,448

[52] U.S. Cl. .............................. 239/311; 239/373; 239/416.5; 239/417.5; 239/423

[51] Int. Cl.² ...................... B05B 1/30; B05B 7/24

[58] Field of Search .......... 239/306, 307, 311, 314, 239/318, 346, 369, 371–373, 416.5, 423, 424, 416.2, 413, 416.4, 417.5; 184/55 R, 55 A

[56] References Cited

UNITED STATES PATENTS

| 920,855 | 5/1909 | Forester | 239/371 X |
|---|---|---|---|
| 2,850,323 | 9/1958 | Veres | 239/424 X |
| 3,106,346 | 10/1963 | Thomas | 239/416.2 X |
| 3,253,788 | 5/1966 | McHugh et al. | 239/318 X |

Primary Examiner—Robert S. Ward, Jr.
Attorney, Agent, or Firm—William P. Green

[57] ABSTRACT

A system for spraying a coolant mist onto a part being machined, and including a container for holding a quantity of coolant liquid and having a distribution head to which the coolant liquid and compressed air or other gas to be used as a propellant are delivered separately, and from which the liquid and gas flow into a plurality of discharge hoses having separate nozzles for spraying the coolant onto a plurality of different work pieces. The distribution head preferably includes a centerpost into which the coolant and propellant gas flow, and a manifold body extending about the centerpost and having a plurality of outlets communicating with the different discharge hoses at different circularly spaced locations.

23 Claims, 8 Drawing Figures

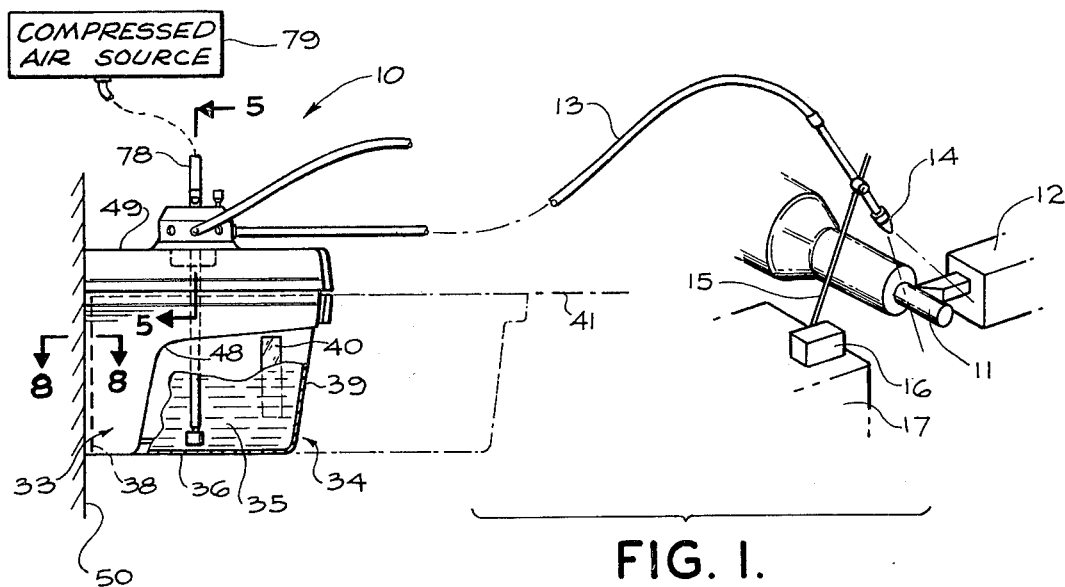
FIG. 1.
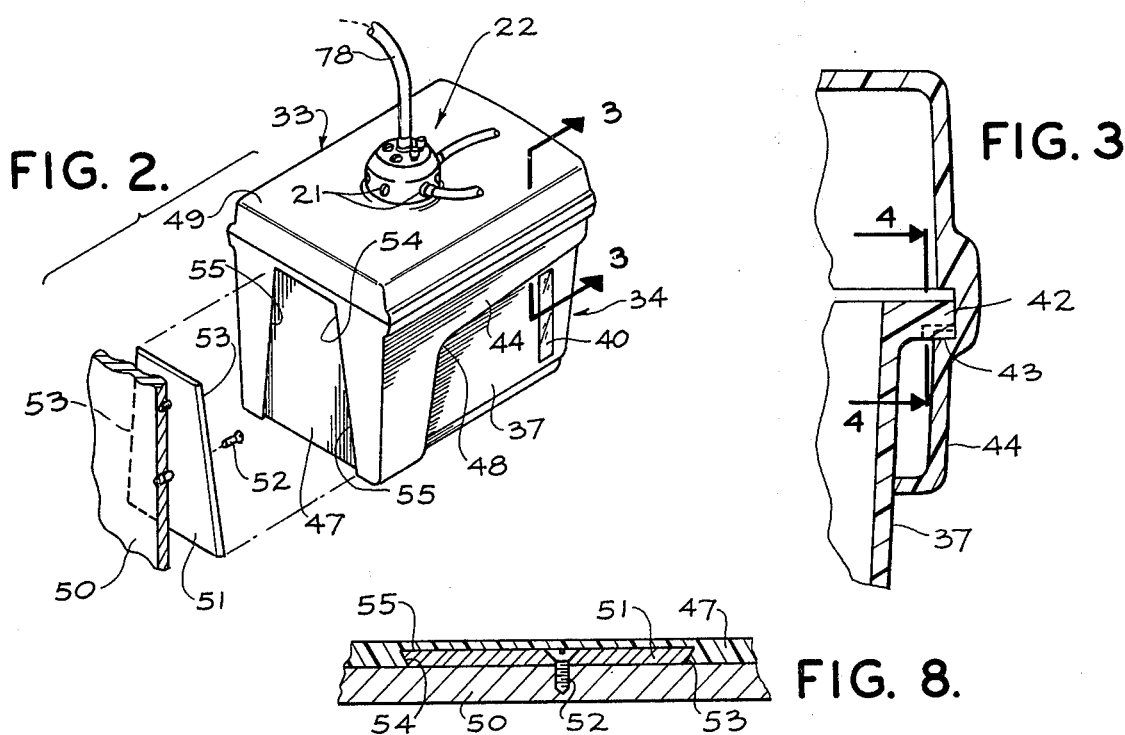
FIG. 2. FIG. 3.
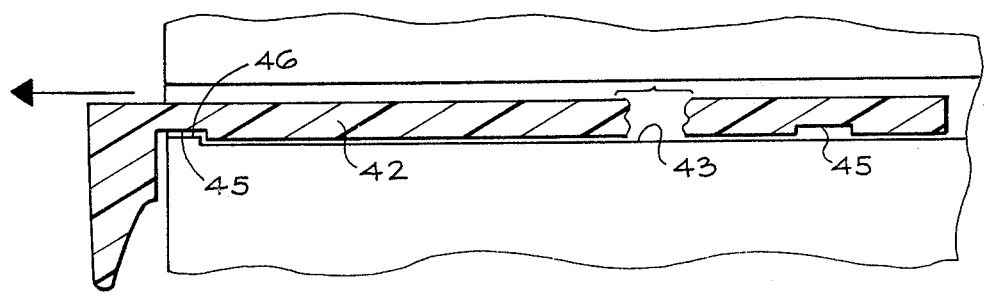
FIG. 8.
FIG. 4.

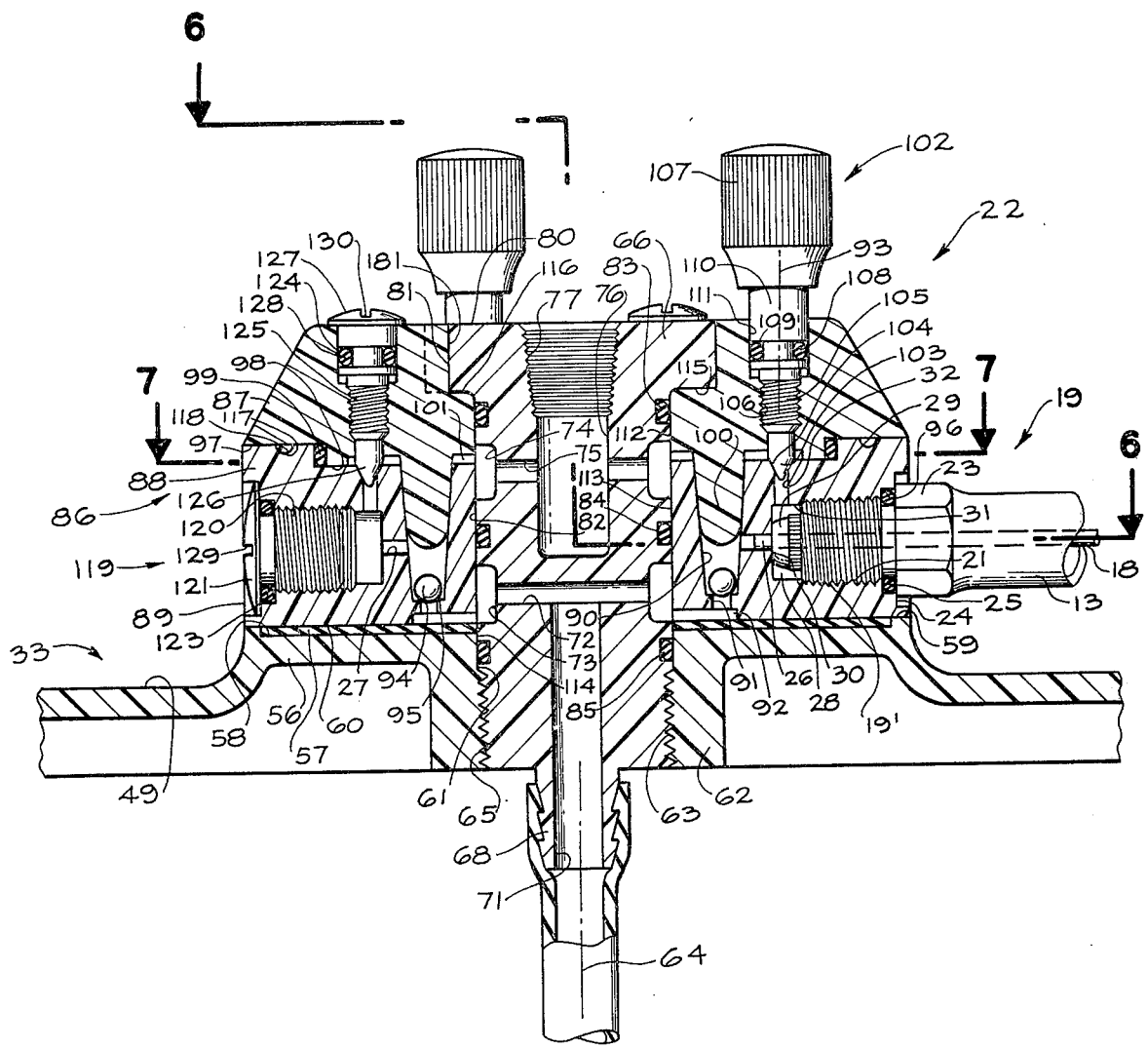
FIG. 5.
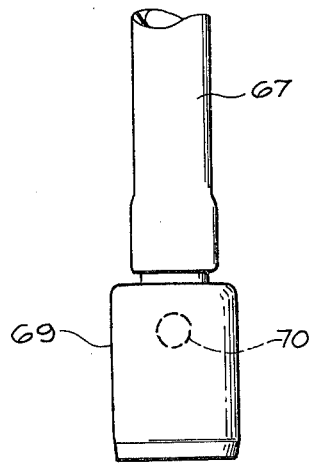

MACHINE TOOL COOLANT APPARATUS

BACKGROUND OF THE INVENTION

This invention relates to improved apparatus for emitting a coolant fluid onto work pieces in machine tools, such as lathes, milling machines, grinding equipment, and the like.

The devices of the invention are of a known general type in which a coolant liquid is sprayed from a discharge nozzle onto a work piece, preferably in a finely divided mist form, in a relation attaining a highly effective cooling action by virtue of evaporation of the liquid as it leaves the nozzle. The liquid and a stream of compressed air or other gas flow separately to the nozzle through two passages in a flexible hose, from a structure mounted to a container which holds a supply of the liquid. In prior arrangements, this structure has taken the form of a block mounted to the top wall of the container, with a manually actuated screw type of valve element connected to the block for varying the rate of air flow to the hose. Some systems have been used in the past in which two or more such blocks have been mounted to the same container, with each having a separate suction line extending downwardly into the container for receiving liquid, and with each having a separate hose and carried discharge nozzle.

SUMMARY OF THE INVENTION

A major purpose of the present invention is to provide an improved mist coolant system of the above discussed type which is better adapted than prior arrangements for use with a plurality of discharge hoses and nozzles leading to different machine tools or different locations on the same tool, and which preferably can be easily converted from different conditions for adding or subtracting hoses to the overall system as may be desired. In particular, the apparatus includes a single unitary distribution head or structure which may be carried by the liquid container and which may have a single liquid inlet line extending downwardly into the container and a single inlet for the propellant compressed gas, but have a plurality of outlets to which different hoses may be connected. This distribution head desirably includes a centerpost to which the liquid and propellant air or other gas are fed separately, and a distribution body extending about the centerpost and having different outlets connectable to different hoses at a plurality of locations spaced apart circularly about the post, with each of the these outlets communicating separately through passages in the distribution body with liquid and gas supply passages in the centerpost. The block also may carry individual manually actuated valves at locations spaced circularly about the centerpost for individually controlling the rate of delivery of compressed air to the different hoses, and thereby individually controlling the rate of discharge of coolant from the various nozzles. Seals between the centerpost and surrounding distribution body maintain the liquid and gas in isolation from one another as they flow from the centerpost to the outer body, and may include a number of axially spaced O-rings between the parts. The distributor body is preferably formed of two sections, each extending about the centerpost, and meeting essentially in a plane disposed transversely of the centerpost, with the outlets to the hoses being formed in a lower one of the sections and with the adjustable valve elements being carried by the upper section and desirably engaging valve seats formed in the lower section. When a particular one of the outlets is not in use, it may be sealed off by connection of a threaded plug into the outlet, and by connection of a second plug into an opening to which an associated adjusting valve element would otherwise be attached.

Certain additional features of the invention relate to the preferred structure and mounting of the liquid container and related parts, and more specifically to a manner in which there may be utilized a mounted unit having a vertical wall connectable by a bracket to a support structure and having an upper wall to which a mist coolant hose may be attached, with the liquid container itself taking the form essentially of a tray which is slidably connectable to the mounting unit.

BRIEF DESCRIPTION OF THE DRAWINGS

The above and other features and objects of the invention will be better understood from the following detailed description of the typical embodiment illustrated in the accompanying drawings in which:

FIG. 1 is a side view of a mist coolant system constructed in accordance with the invention, with the coolant container partially broken away to reveal its interior, and with an associated machine tool and work piece being illustrated diagrammatically;

FIG. 2 is an exploded perspective view of the coolant container assembly and its mounting bracket;

FIG. 3 is an enlarged fragmentary vertical section taken on line 3—3 of FIG. 2;

FIG. 4 is a fragmentary horizontal section taken on line 4—4 of FIG. 3 and showing the slide mounting and detenting arrangement for the coolant tray;

FIG. 5 is a greatly enlarged vertical section taken on line 5—5 of FIG. 1, along the central vertical axis of the fluid distribution manifold assembly;

FIG. 8 is an enlarged horizontal section taken on line 8—8 of FIG. 1.

DESCRIPTION OF THE PREFERRED EMBODIMENT

Figure 6:
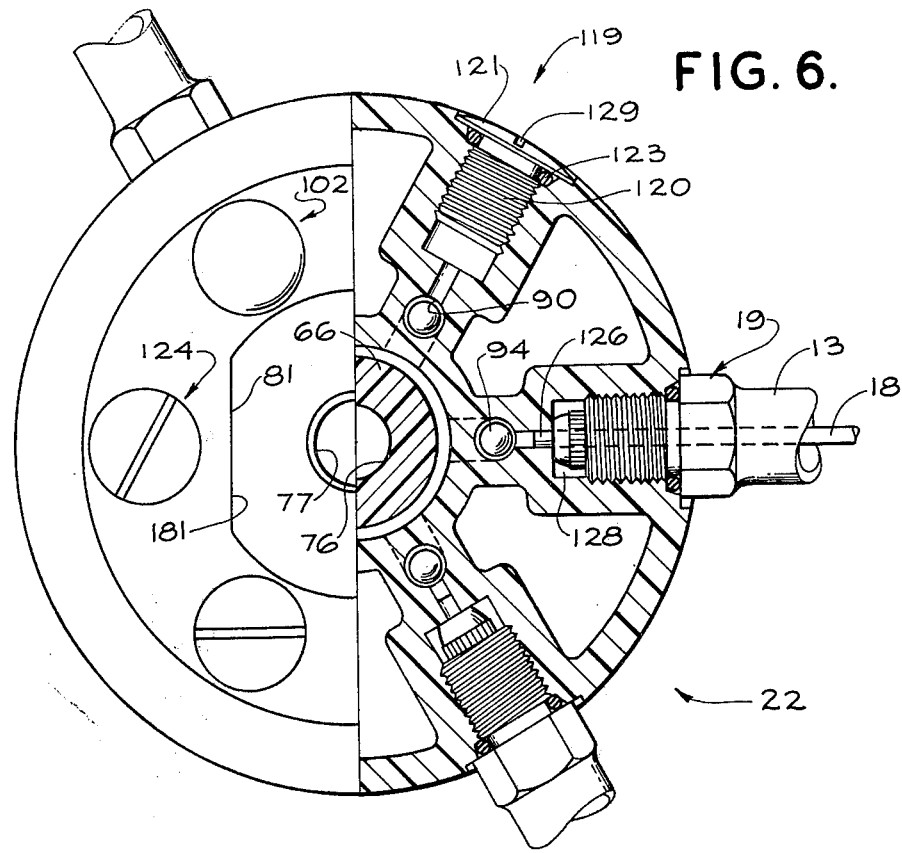
FIG. 6 is a view partially in plan elevation and partially in horizontal section, taken on line 6—6 of FIG. 5.
Figure 7:
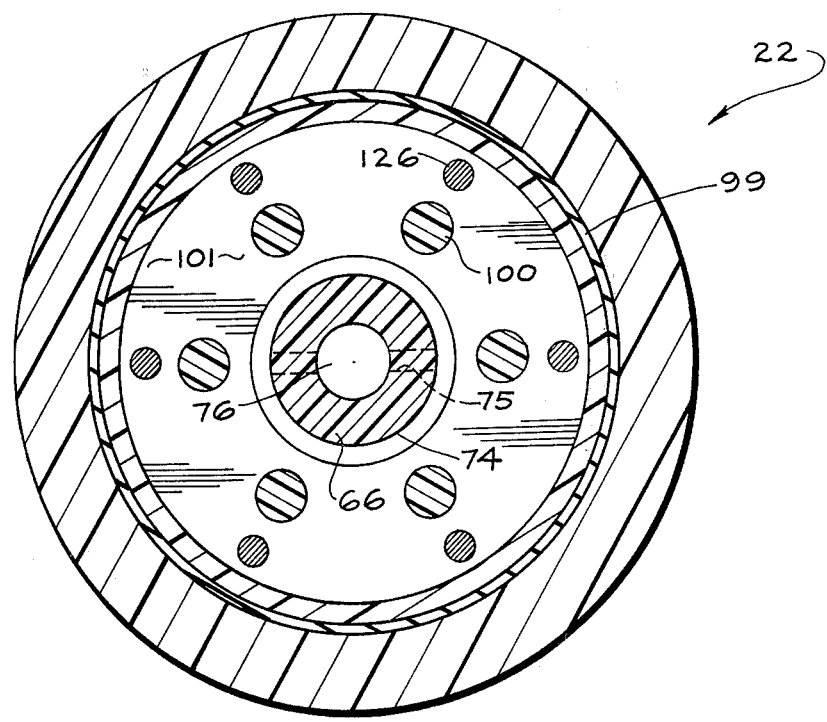
FIG. 7 is a horizontal section taken on line 7—7 of FIG. 5.

Referring first to FIG. 1, there is illustrated generally at 10 a mist coolant system constructed in accordance with the invention, and adapted for spraying coolant in mist form onto any of a number of different work pieces one of which is represented diagrammatically at 11, while the work pieces are being machined by a number of machine tools one of which is represented diagrammatically and fragmentarily at 12. The coolant is delivered to each of the work pieces through an associated one of several flexible hoses 13, each having a discharge nozzle 14 which may be supported at a desired location by a mounting arm 15 connected to any nearby rigid support structure, as by a magnetic mount element 16 carrying the arm 15 and nozzle 14 and attractable magnetically to an appropriate support 17 of steel or other paramagnetic material.

Each of the hoses 13 contains an inner flexible tube 18 extending along its entire length, to define two passages within and about the inner tube 18 for conducting liquid coolant and compressed air (or other compressed gas) to nozzle 14 separately and in isolation with one another, with the air acting at nozzle 14 to entrain the liquid progressively within the air stream and produce a finely divided spray of coolant in mist form emitting toward the work piece. A substantial amount of the liquid vaporizes as or after it leaves the nozzle, and by such evaporation attains a refrigerating effect which cools the work piece and surrounding area during the cutting operation. As seen in FIG. 5, each of the hose assemblies 13-18 has at its inlet end a fitting 19 which is externally threaded at 19' for connection into an internally threaded opening 21 formed in a distribution head 22 which supplies coolant and propellant air to all of the hoses. Each fitting 29 has a flange 23 which abuts against a shoulder 24 on the distributor 22, with an elastomeric O-ring 25 forming a seal at the end of the threads, and with the inner tube 18 communicating through a tube end 26 with a passage 27 through which liquid is supplied to the hose, and with the annular space between the two tubes 13 and 18 being in communication with a space 28 about an elastomeric seal element 29 which abuts against an end wall 30 of the bore 31 in distributor head 22 to receive compressed gas from a vertical passage 32 in head 22.

The hose assemblies consisting of flexible hoses 13 and 18 and their inlet fittings 19 and nozzles 14 are conventional and have been utilized before for mist coolant purposes. In the arrangement of the present invention these hose assemblies receive coolant and air from a common distributor head (22), connected to the upper side of a mounting unit 33, which desirably slidably supports a tray type container 34 within which the coolant liquid 35 is received. This container 34 may be of approximately rectangular but slightly downwardly tapering configuration, having a bottom horizontal wall 36, two slightly downwardly converging opposite side walls 37, a vertical rear wall 38, and a forward wall 39 which converges slightly rearwardly with respect to rear wall 38 as it advances downwardly. Container 34 may be formed of an opaque resinous plastic material or the like, desirably having in its two opposite side walls 37 a pair of transparent vertically elongated sight glass portions 40 through which the liquid within the interior of the container can be viewed to give an indication of the amount of liquid remaining at any particular time. The upper edges of the side, front, and rear walls of container 34 may all terminate upwardly in a common horizontal plane 41, with two horizontal flanges 42 extending in a front to rear direction along opposite sides of the container, and specifically along the upper edges of side walls 37, to engage downwardly against upwardly facing horizontal shoulders 43 formed at the inner sides of two spaced depending side walls 44 of mounting part 33, in a manner supporting container 34 from unit 33 and for horizontal sliding movement relative thereto between the full line active position of FIG. 1 and the broken line retracted filling position thereof. At their undersides, each of the laterally projecting support flanges 42 of container 43 may have a pair of notches 45, near the front and rear ends respectively of the container, for selective engagement with a correspondingly shaped lug 46 projecting upwardly from each of the support surfaces 43 near its forward end (FIG. 4), so that in the full line position of FIG. 1 the two lugs 46 are received within the two forward notches 45 of the container in a relation releasably detenting the container in its active position, while in the opened broken line position of FIG. 1 each of the lugs 46 is received within the rear one of the two corresponding notches 45 to detent the container in that opened position and prevent unintended movement of the container beyond that position in an opening direction.

The mounting unit 33 may also be molded from an appropriate essentially rigid resinous plastic material, and is shaped to have a rear vertical wall 47 extending downwardly at the rear side of back wall 38 of the container, with the two previously mentioned opposite side walls 44 of unit 33 extending downwardly at the opposite sides of walls 37 of the container and extending forwardly from rear wall 47, and preferably being cut away at 48 as illustrated to leave the sides of the container exposed across a substantial portion of their area. A horizontal top wall 49 of mounting unit 33 is rectangular in plan view, and carries the fluid distribution manifold unit 22 to which the hoses are connected. Rear wall 47 of unit 33 is detachably connectable to a support structure 50 by a bracket 51 (FIG. 2) which may take the form essentially of a flat vertical plate attachable by screws 52 to a vertical surface of support 50 and having upwardly converging opposite side edges 53 of a dovetail configuration in horizontal section (see FIG. 8), with bracket 51 being slidable receivable within a correspondingly upwardly tapering recess 54 formed in the rear side of wall 47 of unit 33. The opposite side walls 55 of recess 54 are of the same dovetail shape as edges 53 of bracket 51, so that if the unit 33 is so positioned as to locate bracket 51 within recess 54, and unit 33 is then moved downwardly relative to the bracket, the two parts will interfit in dovetail fashion and rigidly but detachably connect unit 33 to the bracket.

Referring now particularly to FIGS. 5, 6 and 7, the fluid distribution head 22 is connected to top wall 49 of unit 33, which top wall serves as the top of container 34 in its closed condition, at an essentially central location where the top wall 49 may be offset slightly upwardly to form a circular horizontal base 56 on which head 22 is supported. An annular seal ring 57 of rubber or other elastomeric material is supported on the upper horizontal surface 58 of wall portion 56, and confined within a peripheral annular flange 59 which engages the undersurface 60 of head 22 in supporting relation while slightly compressing ring 58 to form an effective annular fluid tight seal between the head and cover 49 about a central opening 61 in the cover. At the location of opening 61, the cover may have a tubular downwardly projecting portion 62 which is internally threaded at 63 about a vertical axis 64 to engage external threads 65 on a vertical centerpost 66 forming the center section of head 22.

Coolant liquid is delivered to the lower end of centerpost 66 through a flexible hose 67 whose upper end is connected onto a tubular lower inlet portion 68 of centerpost 66, and which hose carries at its lower end a fitting 69 received adjacent and slightly above the bottom wall 36 of container 34 and containing a check valve 70 acting to admit coolant into the lower end of hose 67 but preventing reverse or downward flow of the coolant liquid from hose 67 back into the container.

The upper end of hose 67 leads the coolant into an inner vertical passage 71 in centerpost 66, which passage communicates at its upper end with a transverse passage 72 leading to an outer annular groove 73 in the periphery of the centerpost. Spaced above groove 73, the centerpost has a second outer annular groove 74, communicating through transverse passages 75 with a vertical upwardly opening passage 76 having internal threads 77 at its upper end for connection to an air supply hose 78 leading from a source 79 of compressed air or other compressed gas. At its upper end, centerpost 66 has a flange 80 which projects outwardly beyond the diameter of the remainder of the centerpost and is externally circular in horizontal section except at the location of a flat 81. Vertically between the upper flange 80 and lower threads 65, centerpost centerpose has a cylindrical outer surface 82, which is of uniform diameter along that entire length except as it is interrupted to form the two annular grooves 73 and 74, and to provide three axially spaced grooves above, between and beneath grooves 74 and 73 for receiving three axially spaced elastomeric O-rings 83, 84 and 85 for forming annular seals with the outer portions of head 22 to maintain the air and liquid in isolation from one another as they leave the centerpost.

In addition to the centerpost 66, the distributor head 22 includes an outer annular body 86 which may be formed as two upper and lower sections 87 and 88 both formed essentially as rings extending annularly about the centerpost. The lower one of these sections or rings (88) has an outer cylindrical surface 89 extending vertically and centered about axis 64, and containing a plurality of the previously mentioned threaded bores or recesses 21 into which a series of the flexible hoses 13 may be connected at an number of evenly circularly spaced locations about head 22. The inner passage 27 through which liquid is delivered to each of these bores 21 and an attached hose 13, and more particularly to the inner tube 8 within such a hose 13, communicates with an associatd downwardly tapering vertical passage 90 formed in lower body section 88, which leads downwardly through a short lower reduced diameter vertical passage 91 and a radially inwardly extending passage 92 at the underside of body section 88 into the previously mentioned annular liquid supply groove 73 in centerpost 66. The vertical passages 90 and 91 associated with the various circularly spaced outlets 21 extend along different vertical axes 93 which are spaced circularly about and parallel to the main vertical axis 64 of the distributor head 22. Each of the conically tapering passages 90 contains a ball check valve element 94 which is adapted to seat downwardly against an upwardly facing annular valve seat 95 at the juncture of passages 90 and 91 to prevent reverse flow of liquid or air downwardly from passage 90 to passage 91, while permitting upward flow of liquid past the seat and ball valve element and to the associated hose. As will be apparent, the underside of each of the downwardly facing radial passages 92 is closed by engagement of the flat undersurface 60 of lower body section 88 with seal ring 58. The annular O-ring 25 carried by the fitting 19 associated with each of the hoses is engageable against an annular tapering seat 96 on section 88 to form an effective fluid tight seal between the parts at the location.

The two sections 87 and 88 of distributor body 86 have engaging annular horizontal surfaces at 97 and 98, with an elastomeric O-ring 99 received between and engaging the parts at a location radially between the surfaces 97 and 98, to form an annular seal between the parts near their peripheries and extending annularly about main axis 64 of the device. Radially inwardly of this seal, upper section 87 carries a series of downwardly projecting circularly spaced lugs 100, which taper in correspondence with the upper portions of passages 90, and engage tightly downwardly against the walls of those passages to form seals therewith plugging the upper ends of the passages at a level above liquid discharge passages 27. The lugs 100 thus isolate the liquid beneath these lugs from air flowing within an essentially annular space formed vertically between the two sections at 101.

Space 101 communicates annularly at its radially inner extremity with the air supply groove 74 in the outer surface of centerpost 66. Air flows radially outwardly through space 101 (and about the upper ends of lugs 100), to flow downwardly through the previously mentioned vertical passages 32 leading into spaces 28 which communicate with the outer passages radially between hoses 13 and inner tubes 18 within the hoses. This flow of air to each of the hoses is controlled independently by an associated one of several circularly spaced valve elements 102, which is vertically adjustable and has a lower tapered end 103 engageable downwardly against a correspondingly tapered valve seat 104 formed in the upper surface of section 88. Each valve element 102 extends downwardly through a vertical passage in upper body section 87, and has external threads 105 engageable with internal threads 106 in section 87 to move the element 102 upwardly or downwardly in correspondence with manual rotation of its upper enlarged handle end 107. An elastomeric O-ring 108 contained within a groove 109 in an otherwise cylindrical external surface 110 of element 102 is engageable with a cylindrical surface 111 of section 87 to form a fluid tight seal above the location of the adjusting threads 105 and 106, to thus prevent upward escape of compressed gas past element 102.

The two O-rings 83 and 84 carried by centerpost 86 above and beneath air supply groove 74 form annular fluid tight seals with body sections 87 and 88 by engagement with cylindrical surfaces 112 and 113 formed on those sections respectively. The third O-ring 85 forms a similar annular seal beneath liquid supply groove 73 of the centerpost by engagement with a cylindrical inner surface 114 formed in the container cover above threads 63.

The two outer body sections 87 and 88 are held downwardly against portion 56 of the container top by force exerted downwardly by the centerpost 66 through its upper flange 80, by virtue of the interengagement of a horizontal undersurface 115 of the flange with an upwardly facing surface 116 on section 87. The flange 80 has a peripheral cylindrical surface 117 engaging a correspondingly cylindrical counterbore surface 118 of section 87, except at the location of the flat 81 on flange 80 which engages a corresponding flat 181 of section 87 in a relation transmitting rotation from section 87 to flange 80 and the rest of centerpost 66. The two sections 87 and 88 are themselves keyed together rotatively, as by provision of a lug 117 projecting downwardly from section 87 into a recess in the upper side of section 88. Thus, the three parts 66, 87 and 88 are all keyed together rotatively, so that upon assembly of the apparatus these parts may be turned as a unit to screw the threads 65 at the lower end of centerpost 66 into portion 62 of the cover of the container, until the various surfaces 97, 98 and 59 engage tightly.

For closing off one or more of the outlets 21 when it is desired to use fewer hoses than there are outlets, we provide a plurality of closure plugs 119, having threads 120 which are connectable into an associated one of the threaded outlets 21, and having heads 121 tightenable against surfaces 24, with O-rings 123 carried at the inner sides of the heads for forming fluid tight seals preventing escape of fluid from the associated outlets 21. There also may be provided a second set of plugs 124 which are similar to air control valve elements 102, and have threaded portions 125 engaging threads 105, with lower tapered ends 126 being tightenable downwardly against valve seats 104 to effectively close off air flow at those locations. Each of the plugs 124 may have an upper head 127 and carry an O-ring 128 forming a seal with surface 111. The heads 121 and 127 of the plugs may be tightenable downwardly in any desired manner, as by provision of screwdriver slots 129 and 130.

To now describe the use of the disclosed equipment, assume first of all that centerpost 66 and its surrounding parts 87 and 88 have been connected to portion 56 of the container top 49 in the manner illustrated in FIG. 5, and that a supply of coolant liquid has been filled into container 34. Also, assume that the compressed air source 79 has been connected to centerpost 66 by line 78.

If it is desired to use only a single discharged hose 13 and associated nozzle and other parts, the fitting 19 of that hose is connected into the distributor head as illustrated in FIG. 5, in association with one of the valve elements 102, while the other outlets 21 are closed by as many plugs 119, and the valve receptacles associated with those other outlets are closed by upper plugs 124. The delivery of compressed air to the one hose which is in use can then be controlled by actuation of the associated valve elements 102, to move its lower tapered portion 103 toward and away the associated seat 104, to either close off the air flow completely or open it to any desired amount. When air flows past one of these valve elements into the associated passage 32, it is permitted to enter space 28 and flow into the outer annular passage between the connected hose 13 and its contained inner tube 18, to ultimately discharge from the connected nozzle 14 and produce a mist spray for cooling the work piece being machined. When it is desired to utilize more than one hose, additional hoses may be connected into as many of the other outlets 21 as may be required at a particular time, in substitution for the plugs 119, and the corresponding plugs 124 are also removed and replaced by valve elements 102 to enable separate control of the rate of discharge of coolant spray from each of the different hoses and nozzles. When the supply of liquid within container 34 has been used up, this container is slid outwardly to its broken line position of FIG. 1, for refilling and ultimate return to its full line position of that figure for further use of the apparatus.

While a certain specific embodiment of the present invention has been disclosed as typical, the invention is of course not limited to this particular form, but rather is applicable broadly to all such variations as fall within the scope of the appended claims.

We claim:

1. Mist coolant apparatus comprising:
 a container for holding a quantity of coolant liquid;
 at least one flexible hose through which liquid from said container and a compressed gas flow and having a discharge nozzle for emitting a spray of said coolant onto a work piece; and
 a liquid distribution unit for delivering the liquid to said hose;
 said liquid distribution unit including a centerpost containing passages into which liquid from said container and said compressed gas flow in isolation from one another, a body structure disposed about said centerpost and having a plurality of outlet openings at different locations spaced apart circularly about the centerpost and adapted for connection to a plurality of said hoses to deliver liquid and gas thereto, with said body structure containing passages leading liquid and compressed gas from the centerpost separately to said outlets, and valve means for controlling the flow of compressed gas from the centerpost to at least one of said outlets.

2. Mist coolant apparatus as recited in claim 1, including a suction conduit extending downwardly from said centerpost into said container and adapted to draw liquid upwardly from the bottom of the container to said centerpost.

3. Mist coolant apparatus as recited in claim 1, in which said centerpost has an inlet at its underside for receiving coolant from said container, and a second inlet at its upper side to be connected to a source of compressed gas.

4. Mist coolant apparatus as recited in claim 1, in which said centerpost has a threaded portion adapted to be connected threadedly to said container by rotation relative thereto, said centerpost and said body structure having non-circular portions interengagable to transmit rotation from said body structure to said centerpost to enable the centerpost to be rotated for connection to the container by rotation of said body structure.

5. Mist coolant apparatus as recited in claim 1, including axially spaced seal rings between said centerpost and said surrounding body structure forming axially spaced annular seals between which said liquid and gas flow from the centerpost to said surrounding body structure in isolation from one another.

6. Mist coolant apparatus as recited in claim 1, in which said body structure contains an essentially circular central opening within which said centerpost is received, there being three seal rings carried about said centerpost at axially spaced locations and engaging a wall of said central opening of the body structure at axially spaced locations to maintain said liquid and compressed gas in isolation from one another as they flow from the centerpost to said body structure.

7. Mist coolant apparatus as recited in claim 1, in which said body structure is formed of two sections each extending about said centerpost and having opposed faces disposed essentially transversely of the centerpost.

8. Mist coolant apparatus as recited in claim 1, in which said body structure is formed of two sections each extending about said centerpost and having opposed faces disposed essentially transversely of the centerpost and between which said compressed gas is confined in flowing through the body structure.

9. Mist coolant apparatus as recited in claim 1, in which said body structure includes two sections both of which extend about said centerpost, a first of said sections containing said circularly spaced outlets, and said valve means being adjustably carried by the second section.

10. Mist coolant apparatus as recited in claim 1, in which said body stucture includes two sections both disposed about said centerpost and one of which contains said circularly spaced outlets, said valve means including a plurality of adjustable valve elements mounted threadedly to the other of said sections for controlling flow of compressed gas to said outlets respectively.

11. Mist coolant apparatus as recited in claim 1, in which said body structure includes two sections both of which extend about said centerpost, and which have opposed faces disposed essentially transversely of the centerpost and shaped to confine compressed gas therebetween as it flows from the centerpost to said outlets, said outlets being formed in a first of said body sections, said valve means including a plurality of threaded valve elements mounted threadedly to the other of said body sections and adjustable into and out of engagement with seats formed on said first body section to control flow of compressed gas from the space between said sections to said outlets respectively.

12. Mist coolant apparatus as recited in claim 11, including a plurality of check valve elements mounted in individual recesses in said first body section for preventing reverse flow of liquid from said outlets.

13. Mist coolant apparatus as recited in claim 11, including a plurality of check valve elements mounted in individual recesses in said first body section for preventing reverse flow of liquid from said outlets, and pins carried by and projecting from said other body section into said recesses to retain the check valve elements therein.

14. Mist coolant apparatus as recited in claim 13, including an O-ring interposed axially between said two body sections at a location about said valve elements and seats.

15. Mist coolant apparatus as recited in claim 1, in which said centerpost has a lower threaded end threadedly connectable to said container and an upper flange tightenable downwardly against said body structure, said flange having a non-circular portion engaging a non-circular portion of said body structure to rotate the centerpost for threaded connection to the container in response to rotation of the body structure, there being a conduit connected to a lower end of said centerpost to conduct liquid thereto from the container, said centerpost having an upper opening connectable to a source of compressed gas, said body structure including two sections both extending about said centerpost and containing internal cylindrical surfaces, said centerpost carrying three axially spaced seal rings engageable with said cylindrical surfaces of said body sections and with said container to isolate said liquid and gas in flowing from the centerpost to the body structure, said two body sections having opposed faces disposed essentially transversely of the centerpost and confining said gas therebetween as it flows from the centerpost, said passages of the body structure including passages formed at the underside of a lower one of said body sections and through which liquid flows to said outlets, there being an annular seal ring between the underside of said lower body section and said container, said valve means including a plurality of threaded valve elements threadedly connected to the upper of said body sections and engageable downwardly against seat surfaces formed in the top of said lower body section to control the flow of gas to said outlets.

16. Mist coolant apparatus as recited in claim 15, including a first plurality of plugs connectable threadedly to said upper body section in lieu of said valve elements and engageable with said seats to close off gas flow to corresponding ones of said outlets, and a second set of plugs connectable into different ones of said outlets.

17. Mist coolant apparatus as recited in claim 1, including plugs connectable threadedly to different ones of said outlets to close selected ones of said outlets when not in use.

18. Mist coolant apparatus as recited in claim 1, in which said valve means include a plurality of valve elements connectable threadedly into openings in said body structure, therebeing a plurality of plugs connectable into said openings in lieu of said valve elements to selectively close off flow of air to different ones of said outlets when not in use.

19. Mist coolant apparatus comprising:
a container for holding a quantity of coolant liquid and having a bottom wall and vertical side walls and an open upper side;
a mounting unit for said container having an essentially vertical wall adapted to be connected to a support structure and having a top wall extending across said open upper side of said container;
means guiding said container for horizontal sliding movement relative to said mounting unit between a position of use in which said top wall of the mounting unit is disposed across and closes said open upper side of said container and a horizontally retracted position in which said open upper side of the container is accessible for filling of liquid thereinto;
a structure carried by said top wall of said mounting unit for receiving coolant liquid from said container;
a flexible hose connected to said structure and through which coolant and compressed gas flow and having a nozzle at an outer end thereof for spraying coolant onto a work piece; and
means for introducing compressed gas into said hose to propel said liquid therethrough and from the nozzle.

20. Mist coolant apparatus as recited in claim 19, including a bracket to be connected to said support structure and to which said essentially vertical wall of said mounting unit is detachably connectable.

21. Mist coolant apparatus as recited in claim 19, including a vertically extending tapered dovetail bracket to be connected to said support structure, said vertical wall of said mounting unit containing a correspondingly tapered dovetail recess detachably connectable to said bracket to removably connect said mounting unit thereto.

22. Mist coolant apparatus as recited in claim 19, including detent means on said container and said mounting unit for releasably detenting said container in said two positions thereof.

23. Mist coolant apparatus as recited in claim 19, in which said structure carried by said top wall contains a plurality of circularly spaced outlets receiving liquid from the container and compressed gas, there being a plurality of said hoses connectable to different ones of said outlets to spray coolant on a plurality of different work pieces.

* * * * *